Nov. 1, 1932.   F. K. KRAG ET AL   1,885,730
EXTENSION HANDLE FOR UTENSILS, SUCH AS FLY SWATTERS AND THE LIKE
Filed Nov. 2, 1928
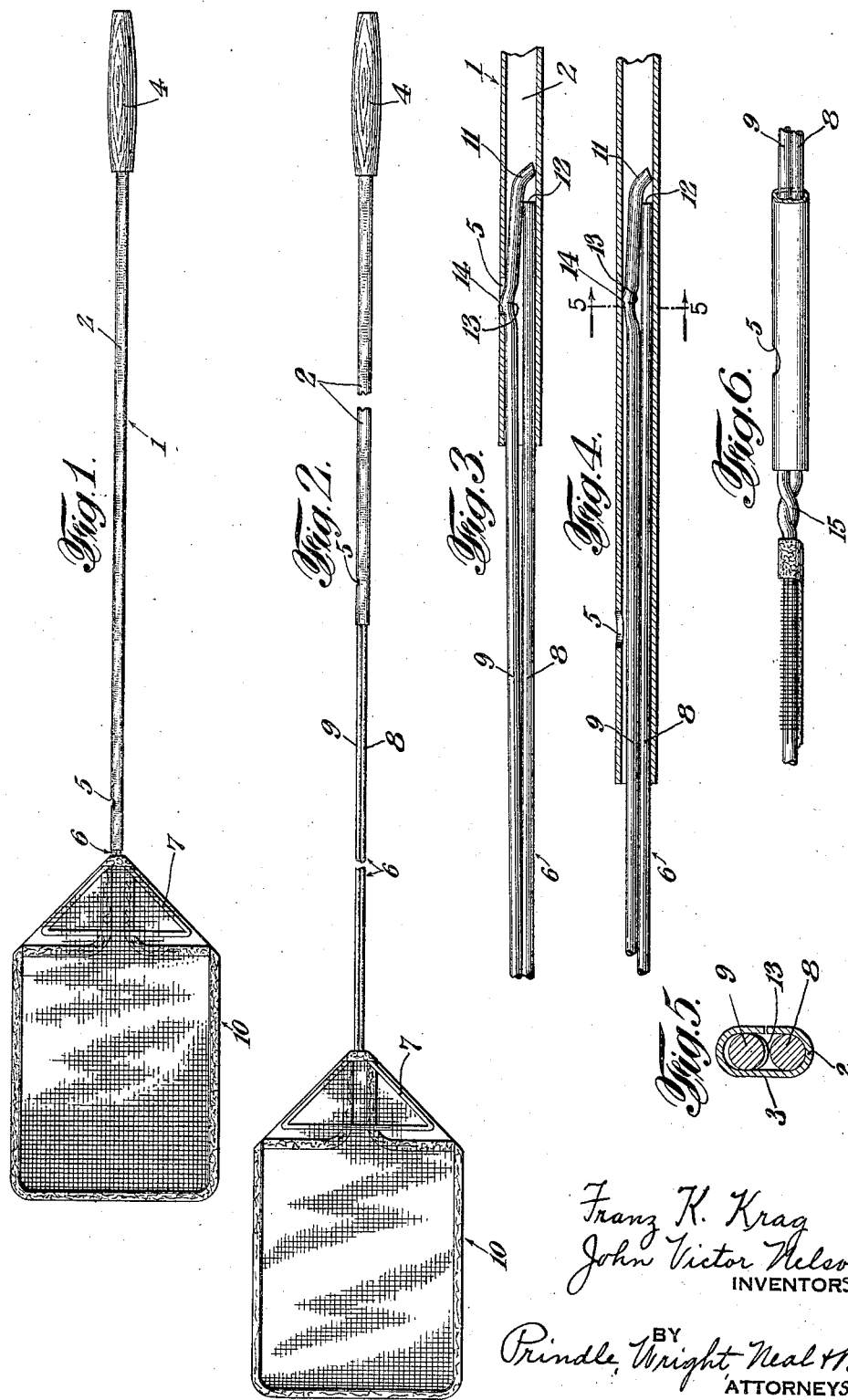

Patented Nov. 1, 1932

1,885,730

UNITED STATES PATENT OFFICE

FRANZ K. KRAG, OF CHICAGO, AND JOHN VICTOR NELSON, OF MAYWOOD, ILLINOIS, ASSIGNORS TO U. S. MANUFACTURING CORPORATION, OF DECATUR, ILLINOIS, A CORPORATION OF ILLINOIS

EXTENSION HANDLE FOR UTENSILS, SUCH AS FLY SWATTERS AND THE LIKE

Application filed November 2, 1928. Serial No. 316,663.

This invention relates to improvements in extension handles adapted for use with fly swatters and utensils or implements of various kinds, and the principal object of the invention is the provision of such a handle construction which is strong in various extended positions and also sufficiently rigid, as well as resilent, to serve its purposes efficiently.

Further objects of the invention include the provision of such a device which may be made cheaply and quickly on a production basis, in which the various parts may be adjusted to various lengths and held in these adjusted positions by friction, which has positive stop means for fixing the extreme limit of extension, and which may be used with or as part of various utensils and implements, and which lends itself to decoration or ornamentation in various ways.

To the accomplishment of the foregoing, and such other objects as may hereinafter appear, this invention consists in the construction, combination and arrangement of parts hereinafter described and then claimed in the appended claims, reference being had to the accompanying drawing, which discloses one embodiment of this invention, it being understood, however, that various changes may be made in pratcice within the scope of the claims without digressing from our inventive idea.

In the drawing:

Fig. 1 is a perspective view of one form of this invention shown in connection with a fly swatter, the parts being shown in non-extended position;

Fig. 2 is a view similar to Fig. 1, the parts being shown in extended position;

Fig. 3 is an enlarged view showing the parts of the handle in their most extended position;

Fig. 4 is an enlarged view showing the parts in non-extended position;

Fig. 5 is a vertical cross-section on line 5—5 of Fig. 4; and

Fig. 6 is a broken view of part of the structure, including a slight modification.

The drawing illustrates a fly swatter, or the like, using a device constructed in accordance with this invention. It is, of course, understod, as previously stated, that this construction may be used in connection with other devices.

The numeral 1 designates the main handle part which is preferably in the form of a metallic tube 2 flattened at each side as at 3, so as to have a rather elongated cross-section. To one end is secured the gripping element 4 and near the other end is provided an opening or aperture 5 which forms a stop-engaging means.

The other handle part, which is the slidable part, is designated generally by the reference character 6, and is in the form of a wire or rod bent to provide a triangular head 7 and extended handle portions 8 and 9. The flyswatter body 10 is suitably connected to the head 7 as indicated.

The handle part 9 is longer than the handle part 8, and the end 11 thereof is bent or turned over the end 12 of the other handle part. Furthermore, the handle part 9 is bent or bowed so as to be sprung slightly away from the other handle part 8. In addition, one of the handle parts is formed or provided with a stop 13 which in its preferred embodiment, as shown, includes a bend or bulge formed in the wire with a shoulder 14 cut at one end thereof. Due to the bowed formation of the wire handle part 6, this stop element will spring into the opening or aperture 5 so that the shoulder 14 engages the edge thereof, and thereby constitute a positive stop limiting the extending movement of the parts.

The bent end of the handle part 9 and the bowed arrangement of the same insure sufficient frictional engagement with the inner surface of the tube 2 so that the parts will be frictionally held in any adjusted position with sufficient safety to permit operation of the device. Of course, the stop and the stopengaging means cooperate to fix the extreme limit of extension positively.

The device is cheap to manufacture, composed of few parts, readily assembled, simple and strong in construction and easily adjusted or extended to various lengths.

In Fig. 6 a slight modification is shown which involves twisting the wire handle parts 8 and 9 at or near the apex of the triangular head 7, as indicated at 15, so as to add strength and rigidity to the construction at this point.

What we claim is:

1. An extension handle construction including a main handle part formed of a tube having an aperture formed in one side thereof near the open end thereof, an extension handle member slidably mounted in said tube composed of wire and the part fitting within the tube including a pair of strands, one of said strands being provided with a positive stop element to engage said aperture to limit the extension movement of the parts relative to each other.

2. An extension handle construction including a main handle part formed of a flattened tube having an aperture formed in one side thereof near an open end thereof, an extension member slidably mounted in said tube composed of wire and the part fitting within the tube including a pair of strands, one of said strands being bowed and formed with a shoulder to provide frictional engagement with the tube and to engage said aperture to limit the extension movement of the parts relative to each other.

3. A device of the character described, including a body, a handle member connected to said body and having a pair of elongated strands extending from said body, a tubular main handle part provided with an aperture, said pair of strands being slidably mounted in said tubular handle part, one of said strands being sprung slightly away from the other strand and being provided with a projection, the strands forming a construction which resiliently frictionally engages with the inside of said tubular handle part, the projection being received by the aperture in the tubular handle part to form means for limiting the extension movement of the two parts relative to each other.

4. An extension handle construction, including a main handle part formed of a tube having an aperture, an extension handle member slidably mounted in said tube and the part fitting within the tube including a pair of strands, the strands being formed of resilient material, one of said strands being provided with a stop element for engagement with said aperture for limiting the extension movement of the parts relative to each other, the strands being under tension within the tube and the stop element being received by said aperture.

5. A device of the character described, including a main handle part formed of a tube provided with an aperture, an extension member slidably mounted in said tube, the part fitting within the tube including a pair of strands, one of said strands being sprung slightly away from the other strand and formed with a shoulder to provide frictional engagement with said tube and said shoulder being received by said aperture to limit the extension movement of the parts relative to each other.

In testimony that we claim the foregoing, we have hereunto set our hands this 26th day of October, 1928.

FRANZ K. KRAG.
JOHN VICTOR NELSON.